(12) United States Patent
Kumar et al.

(10) Patent No.: US 12,483,517 B2
(45) Date of Patent: Nov. 25, 2025

(54) NON-BLOCKING DISTRIBUTED RESOURCE ALLOCATION AND RESOLUTION ACROSS FORWARDING AGENTS USING DEPENDENCY PROPAGATION

(71) Applicant: ARISTA NETWORKS, INC., Santa Clara, CA (US)

(72) Inventors: Ashwini Kumar, Santa Clara, CA (US); Ramakrishna Paduvalli, Santa Clara, CA (US); Ramya Edara, Santa Clara, CA (US); Sriram Sellappa, Santa Clara, CA (US); Suhas Joshi, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 167 days.

(21) Appl. No.: 18/326,821

(22) Filed: May 31, 2023

(65) Prior Publication Data

US 2024/0406119 A1 Dec. 5, 2024

(51) Int. Cl.
*H04L 47/78* (2022.01)
*H04L 47/80* (2022.01)

(52) U.S. Cl.
CPC .......... *H04L 47/781* (2013.01); *H04L 47/801* (2013.01)

(58) Field of Classification Search
CPC ............................. H04L 47/781; H04L 47/801
See application file for complete search history.

(56) References Cited

U.S. PATENT DOCUMENTS

| | | | |
|---|---|---|---|
| 7,817,549 B1 * | 10/2010 | Kasralikar | H04L 43/026 370/235 |
| 9,935,885 B1 * | 4/2018 | Shen | H04L 45/64 |
| 2012/0163389 A1 * | 6/2012 | Zhang | H04L 47/125 370/400 |
| 2017/0134277 A1 * | 5/2017 | Bifulco | H04L 45/745 |
| 2020/0042536 A1 | 2/2020 | Kaushik | |

(Continued)

OTHER PUBLICATIONS

Office Action issued for U.S. Appl. No. 18/301,394, mailed Oct. 1, 2024, 6 pages.

(Continued)

*Primary Examiner* — Joe Chacko
(74) *Attorney, Agent, or Firm* — Sprinkle IP Law Group (57) ABSTRACT

Systems and methods for handling resource requests in programming of network device tables. A feature agent of a network device enters a resource request for a resource in a resource table and a resource server returns a response to the request, where the response includes a resource value and a dependency constraint encapsulating validity criteria for utilizing the resource value. When the resource value and dependency constraint are returned, the feature agent writes an entry to a software table, where the software table entry includes the resource and the corresponding dependency constraint. A hardware examines the software table entry and determines whether the dependency constraint has been satisfied. When the dependency constraint has been satisfied, the hardware agent writes an entry corresponding to the software table entry in a hardware table. The network device then processes packets according to the hardware table with the new entry.

20 Claims, 5 Drawing Sheets

(56) References Cited

U.S. PATENT DOCUMENTS

2022/0239582 A1\* 7/2022 Maric .................... H04L 45/02
2024/0345763 A1 10/2024 Kumar et al.

OTHER PUBLICATIONS

Notice of Allowance issued for U.S. Appl. No. 18/301,394, mailed Jan. 16, 2025, 9 pages.
Corrected Notice of Allowance issued for U.S. Appl. No. 18/301,394, mailed Jan. 24, 2025, 2 pages.

\* cited by examiner (Prior art)
FIG. 1

NON-BLOCKING DISTRIBUTED RESOURCE ALLOCATION AND RESOLUTION ACROSS FORWARDING AGENTS USING DEPENDENCY PROPAGATION

BACKGROUND

Features in network devices are implemented by feature agents. Feature agents are processes that run on the operating systems of the network devices. The features may concern, for example, security policies, packet routing, packet tunneling, etc. Many of these feature agents implement the corresponding features by managing corresponding hardware tables in the forwarding chip (which may also be referred to as the ASIC, or application specific integrated circuit) of the network device.

Over time, new features are introduced, so the number of features that are provided on network devices continues to increase. Each of the features is typically implemented using a corresponding feature agent, so the number of feature agents that are executing on a given network device continues to increase as well. Because of the large number of feature agents and the interaction between the feature agents, the operation of the feature agents and the network device has become more inefficient.

One of the reasons for the inefficiency relates to the fact that many of the feature agents need to write to hardware tables in order to implement their corresponding features. When a feature agent is constructing an entry to be written into one of these tables, it may be necessary to obtain attributes so that the corresponding information can be included in the entry. Some of these attributes may not be readily available from the feature agent itself, but may instead have to be obtained from a resource in some other part of the system, from other feature agents as a service, from a summary source, etc. Thus, the entry is dependent upon the resource (which may also be referred to as a server agent).

When it is necessary for a feature agent to obtain an attribute from a resource, the feature agent must request the attribute from the resource and then wait for the resource to be resolved, allocated and communicated back to the feature agent. Once all of the requested attributes have been returned to the feature agent, the feature agent can complete construction of the entry and can proceed to write the entry to the appropriate table.

One problem with this process is that it takes time for the resources to be resolved and for the attributes to be returned to the feature agent. This causes delays in the construction of the entry by the feature agent. The problem is worse when there are multiple attributes upon which the entry is dependent, and is further aggravated in situations where there are dependencies across multiple resources (e.g., where an attribute to be provided by one resource is itself dependent upon obtaining an attribute from a different resource). Because of the delays resulting from these dependencies, the process of constructing the entries to be written to the tables in the network device can become very inefficient.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

As noted above, various factors are causing the operation of feature agents to become less efficient, and in some cases causing the feature agents to not work properly. Scale requirements are increasing, sometimes by orders of magnitude, and more networking features are being requested by customers. Additionally, the number of platforms having chipsets from different vendors is increasing, and the feature agents need to be supported in each of these chipsets. Still further, the tasks of the feature agents are in some cases becoming repetitive and prone to problems.

Feature agents that program entries into the tables in the forwarding chip of the network device are inefficient in part because the feature agents may need to program information which is not readily available to them into a table of the network device. When the information to be programmed into a table by a feature agent is dependent upon a resource (a source other than the feature agent itself), the feature agent must currently request the resource and then wait for any dependencies in the resource to be resolved before the resource can be provided to the feature agent.

Only after the requested information (a resource value) is provided by the resource with no unresolved dependencies can the feature agent construct the part of the entry that includes the requested resource value. If there are multiple dependent resource values, each of the resource values must be resolved and returned to the feature agent. After all of the necessary resource values have been obtained, the entry can be completed and programmed into the hardware table by the feature agent. The need to wait for the resolution of the dependencies delays the programming of the entry into the table and makes the feature agent's process of writing entries to the tables more inefficient.

This problem may be further aggravated by the fact that some of the entries to be written in the hardware tables must be written in a particular order. This may be necessary, for instance, to ensure proper routing of packets based on the entries written in specific hardware tables. In some cases, the delays incurred in waiting for dependencies to be resolved for a first entry may delay requests for resources needed by subsequent entries. Once the resource requests for the subsequent entries are made, these resources must be resolved, incurring additional delays.

In embodiments disclosed herein, rather than requiring that all of the resources for a given entry be resolved before the entry can be written to the appropriate table, the feature agent constructs the table entry with an unresolved resource and an associated dependency constraint. An entry corresponding to the unresolved resource is stored in a resource table, and the resource is requested from the resource server via a request/response communication channel. The server returns to the resource table a response to the request with an appropriately modeled dependency constraint. The feature agent uses the resource result and dependency constraint returned by the server to finalize an entry which is programmed into a software table. A hardware agent then accesses the software table to get the information to be programmed into a corresponding hardware table, together with its dependency constraint. The hardware agent uses the dependency constraint to determine when the entry can be written into the hardware table.

Since the feature agent does not have to wait for the requested resource to be resolved and available for use before it can write the entry into the software table, the feature agent does not suffer from delays resulting from waiting for the requested resource to be resolved, and can therefore write entries into the software table more quickly and efficiently. Additionally, since the dependency constraint for the requested resource is obtained through the resource table, and the task of determining when the dependency constraint has been satisfied and the resource is available to be utilized is performed by the hardware agent, the feature agent has less of a processing load and can be asynchronous. This results in higher performance by the feature agent in comparison with existing systems.

Figure 1:
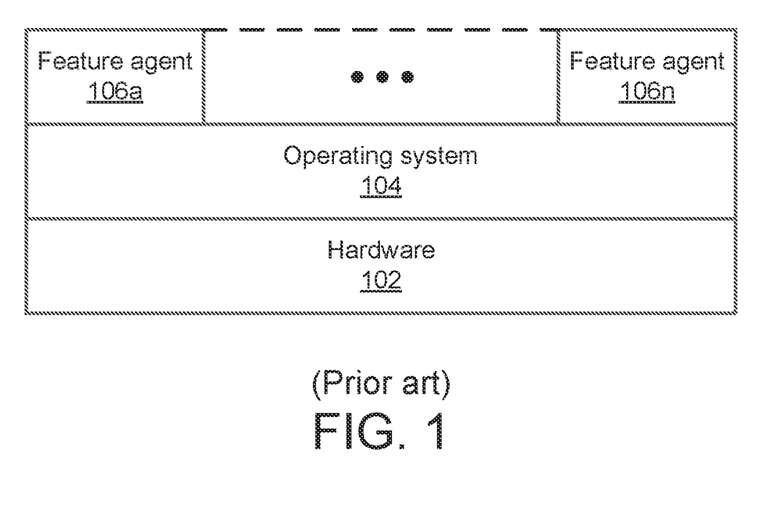
FIG. 1 is a diagram illustrating the high level architecture of a system in accordance with some embodiments.

Referring to FIG. 1, a diagram illustrating the high level architecture of a system in accordance with one embodiment is shown. As depicted in this figure, an operating system 104 runs on the hardware 102 of a network device. A set of feature agents 106 run on top of operating system 104. Feature agents 106 are software applications that implement a number of advanced networking features at high scale and performance on the network device.

It should be noted that different instances of the same or similar devices may be identified herein by a common reference number followed by a letter. For instance, as depicted in FIG. 1, there are a set of feature agents identified by reference numbers 106a-106n. The individual feature agents may be referred to collectively by the reference number 106 alone. References to individual feature agents 106 will include the letter as well as the number (e.g., feature agent 106a or feature agent 106n). The same is true for the other figures in the application as well.

In existing network devices, feature agents have evolved to the point that some of them serve as table managers. These feature agents manage hardware tables in the network device that are used, for example to maintain routes for forwarding packets that are processed by the ASIC of the network device, defining some kind of security policy, or other functions of the network device. If it is necessary to write data into a particular hardware table, a message is sent to a feature agent associated with the table, and the feature agent writes the data into the table. Embodiments described herein concern these feature agents that are tasked with writing data into the hardware tables.

Commonly, the types of tasks performed by these feature agents involve writing multiple hardware tables in the chip, rather than only a single table. In some cases, some of the hardware tables are owned by one feature agent (i.e., the tables are written to by only that feature agent), while other hardware tables to which writes need to be made are owned by some other feature agents. In other cases, certain hardware resources may be applicable or usable across multiple features. For example, a MAC address can point to the FEC table (e.g., in L2 forwarding to a VXLAN tunnel), or an access control list (ACL) entry can point to the FEC table for policy-based routing (PBR). Cross-agent coordination is therefore required in order to be able to request allocation of resources from one agent to another.

Before a feature agent writes an entry to one of the tables, it must construct the entry. Particular table entries require certain resource values before they can be written into the table, but these resource values may not be readily available to the feature agent. The software table defines which attributes of the entry need to be obtained from some resource outside the feature agent. The software table definition also defines the resource from which the attributes need to be obtained. The resource values may instead be available in other parts of the system, such as some other feature agent as a service (a server agent), a summary source, etc. which will provide the resource value that is needed to construct the table entry. These sources of resource values may be referred to herein as resources or resource servers.

Some networking features are dependent on each other in some way, and in order for one feature agent to program its own networking feature, it is frequently necessary for the feature agent to obtain one or more resource values which are allocated or resolved by some other feature agent. The table entries that are to be written by the first feature agent into the tables may therefore be dependent on the other resources.

Conventionally, the feature agent requests the needed resource values from the resource servers, and then the resource servers must resolve the resources and ensure that the resource values are valid before returning them to the feature agent. Because it may take some time for the resource server to resolve the resource before being able to ensure that the corresponding resource value is valid, there is typically a delay between the time the resource value is requested by the feature agent and the time the resource server can return the valid resource value to the feature agent. The delay in obtaining the resource value delays the process of the feature agent constructing the entry and consequently reduces the efficiency of the feature agent.

Figure 2:
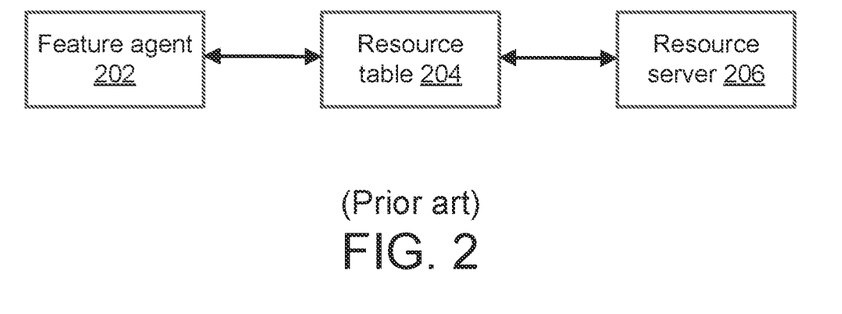
FIG. 2 is a diagram illustrating the relationship between a feature agent, a resource table and a resource server in an existing network device.
Figure 3:
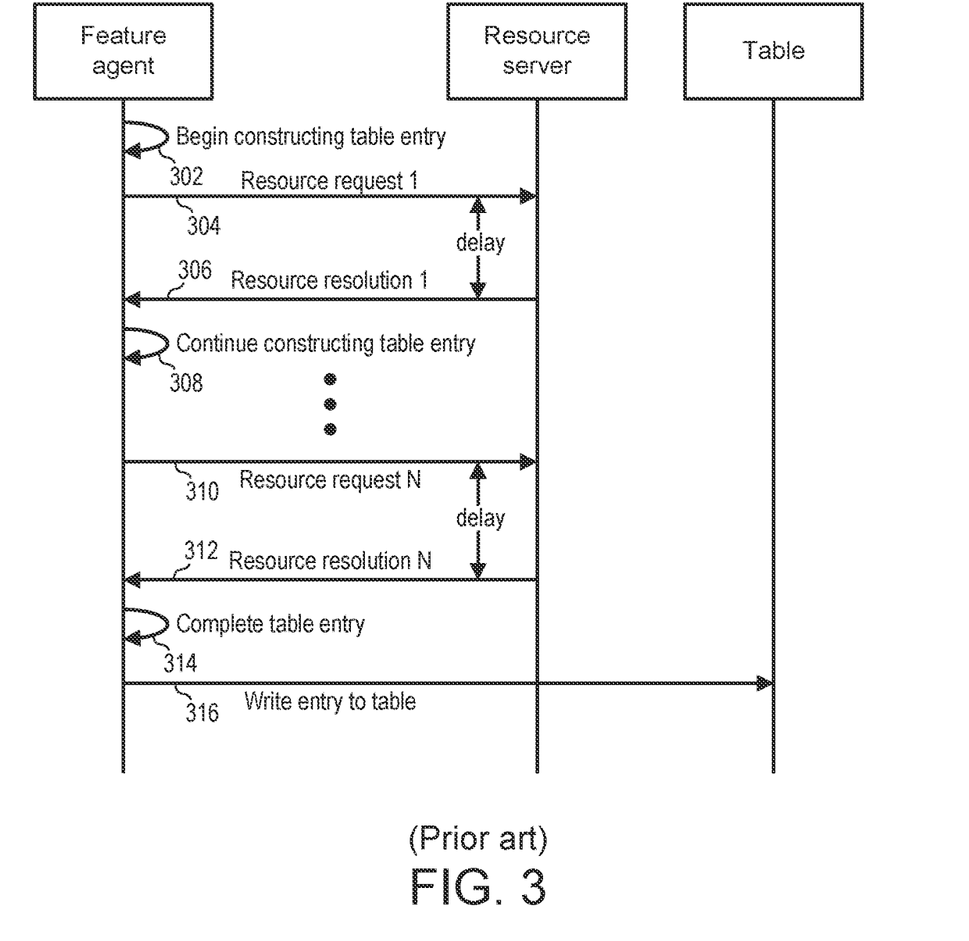
FIG. 3 is a transaction diagram illustrating a process of constructing a table entry in an existing network device.

The conventional operation of the feature agent in obtaining resource values for construction of a table entry is illustrated in FIGS. 2 and 3. FIG. 2 is a diagram illustrating the relationship between a feature agent, a resource table and a resource server. FIG. 3 is a transaction diagram illustrating a process of constructing a table entry.

Referring to FIG. 2, the relationship between a feature agent 202 and a resource server 206 is shown. In this system, feature agent 202 submits a request for a resource value to a resource table 204. The requested resource value is identified in resource table 204 by resource server 206. Resource server 206 resolves the resource to obtain the requested resource value and, when the resource value has been obtained and validated, the resource server stores the valid resource value in the resource table. When the valid resource value has been stored in resource table 204, feature agent 202 can retrieve the value from the resource table and can use the resource value in constructing a table entry.

Referring to FIG. 3, the process of a conventional feature agent constructing a table entry and writing the entry to a corresponding table is shown. This process starts with the feature agent beginning to construct an entry to be written to one of the tables of the network device (302). The content of the table entry is defined by the table. Particular attributes of an entry may be defined by the table to require resource values from resources external to the feature agent, so the feature agent must request these values from the corresponding resources.

At step 304, the feature agent makes a request for a first resource value to a resource server. Although not shown in this figure, the request to the resource server may be made through a resource table as shown in FIG. 2. When the resource server receives the request, it begins processing the request to resolve the resource and obtain the requested resource value.

Frequently, it takes time to resolve the resource and obtain a valid resource value responsive to the request. In a conventional system, until the resource server has a value which is valid and ready to be used by the feature agent, the resource server will not provide the resource value to the feature agent. Consequently, the resource server's response to the request is not an immediate, real time response, and the feature agent must wait for the valid resource value before it can complete construction of the table entry.

At step 306, the resource server has resolved the resource and obtained a resource value that it has determined to be valid, so this resource value has been resolved and is returned to the feature agent. Having obtained the resource value in response to the first resource request, the feature agent can continue constructing the table entry which requires this value (308).

The process of requesting resource values, waiting for the resource server to resolve the corresponding resources, and returning valid resource values to the feature agent is repeated for any values that the feature agent is required by the table definition to obtain for the entry. When the last required resource value has been requested resolved and returned to the feature agent (310-312), the feature agent can proceed to complete the table entry (314). Once the table entry is completed, the feature agent writes the entry to the table (316).

FIG. 3 Illustrates the problem with conventional systems that the time required to resolve resources and to provide valid resource values to the feature agent delays the construction of table entries by the feature agent. This makes the operation of the feature agents inefficient. In order to reduce or eliminate this problem, embodiments disclosed herein do not require that the resource server return only valid resource values to the feature agent. Instead, the resource server immediately returns a resource value, but also returns dependency criteria that are associated with the resource value. The feature agent can therefore continue constructing the table entry without delay. When constructing the table entry, the feature agent includes the dependency criteria with the resource value, so that the validity of the resource value can be determined later, but before the resource value is written into the hardware table where it will be used by the network device.

Figure 4:
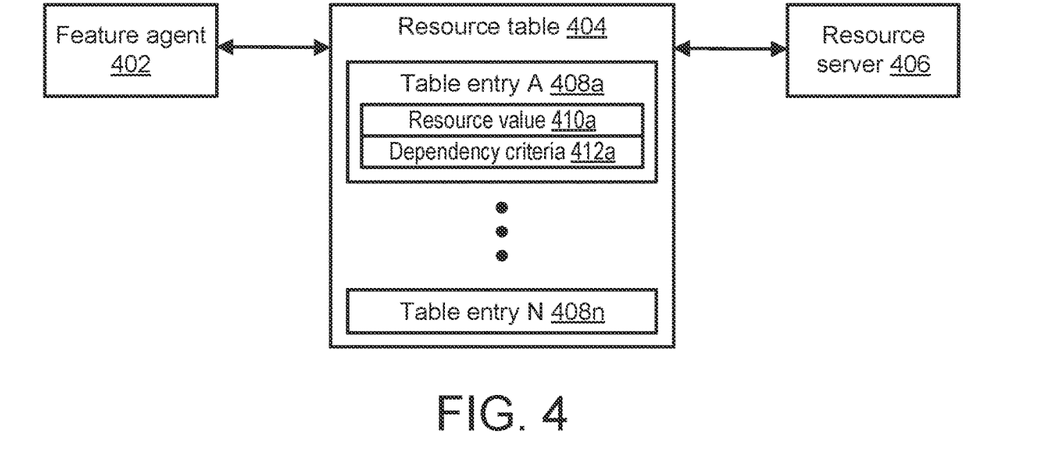
FIG. 4 is a diagram illustrating the structure of a resource table for storing resource values and associated dependency criteria in accordance with some embodiments.

Referring to FIG. 4, a diagram illustrating the structure of a resource table for storing resource values and associated dependency criteria is shown. As depicted in this figure, feature agent 402 communicates requests for resource values to a resource table 404, similar to the way conventional systems request these values. Resource server 406 receives the requests from resource table 404 and obtains the requested resource values, but the resource server does not have to determine the validity of the values before it returns them to the resource table. Instead, responsive to a request for a resource value, resource server 406 makes an entry 408 in the resource table which includes both the resource value 410 and corresponding dependency criteria 412. Feature agent 402 then retrieves resource value 410 and associated dependency criteria for 12 from resource table 404 so that it can construct the table entry that requires the resource value.

Figure 5:
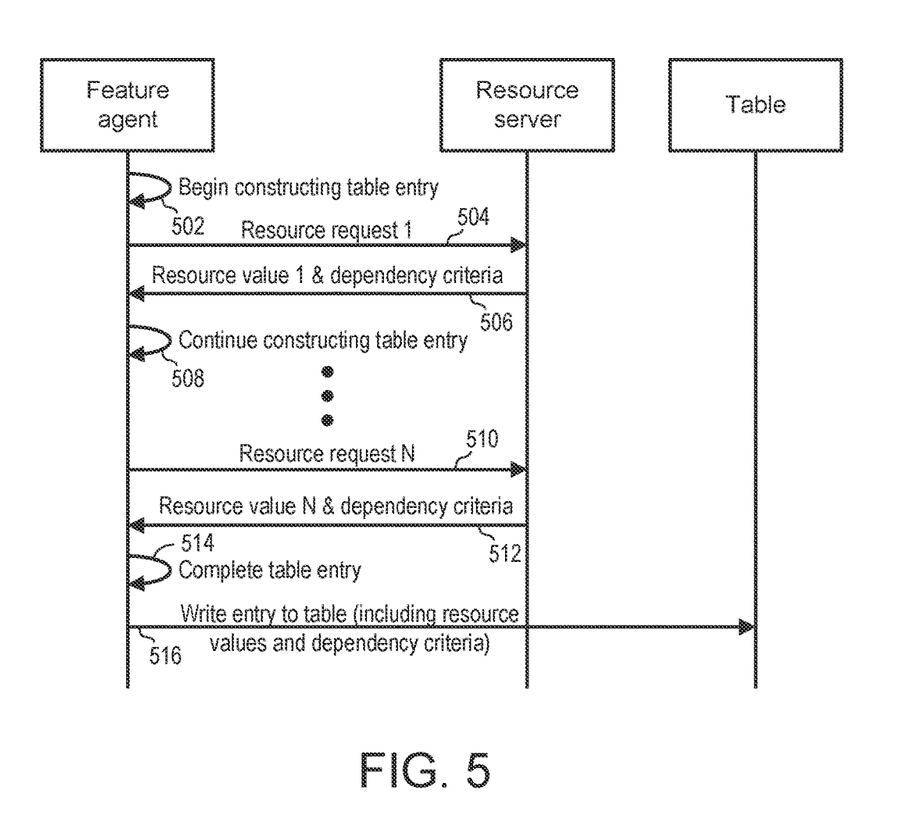
FIG. 5 is a transaction diagram illustrating the process of a feature agent constructing a table entry and writing it to a table in accordance with some embodiments.

Referring to FIG. 5, a transaction diagram illustrating the process of the feature agent constructing a table entry and writing it to the table is shown. The feature agent initially obtains the requirements for the table entry from the table definition and begins constructing the entry (502). The feature agent determines that a resource value is required from an external resource, so it makes a first resource request to the resource server (504). As noted above, this resource request is made through the resource table, although the table is not explicitly shown in FIG. 5.

When the resource server receives the request, it resolves the resource to obtain the requested resource value. The resource server also determines dependency criteria for the resource value which determine when the value is valid and can be written to one of the hardware tables of the network device. The resource server then returns both the resource value and the dependency criteria to the feature agent through the resource table (506). The feature agent proceeds with the construction of the table entry using the returned resource value (508). The table entry includes the dependency criteria so that the validity of the resource value, hence the table entry, can be determined later.

The dependency criteria may be any criteria that must be met for corresponding resource resolutions to be valid. One simple example of dependency criterion is a reference or pointer to some boolean configuration flag. The resource value associated with this criterion will be valid and usable only when the configuration flag is true. The configuration flag must be accessible by the requesting feature agent (e.g., it may be global). With respect to FIG. 5, transaction 506, the resource value returned by the resource server can be accompanied by, for example, a reference to a configuration parameter P (which can be either true or false) as the dependency criterion.

Another example of dependency criteria is "entry write status". In this example, a resource value will be valid and usable only when the entry write status of an entry in some table is complete (i.e., the entry is written into hardware). With respect to FIG. 5, transaction 506, the resource value returned by the resource server can be accompanied by, for example, the entry write status of some entry E in table T as the dependency criterion. The table T may or may not be a table that is being managed by the resource server agent.

The table entry constructed in transaction 508 may include a number, N, of resource values that need to be obtained from external sources, so the process of identifying the required resource values, requesting the resource values and receiving the resource values and associated dependency criteria is repeated (510-512) until all of the required resource values are obtained. The feature agent then completes the table entry, including dependency criteria associated with each of the resource values from the external resources (514). The completed entry is then written to a software table (516).

Because one or more of the resource values in the table entry are not yet valid at the time construction of the entry is completed by the feature agent, the entry cannot yet be written to the hardware table that is the ultimate destination of the entry. The entry must instead be written to an intermediate table (e.g., a software table) where it can be stored until all of the resource values are determined to be valid. Only after all of these values are determined to be valid can the entry be written to the appropriate hardware table so that it can be used by the network device.

Figure 6:
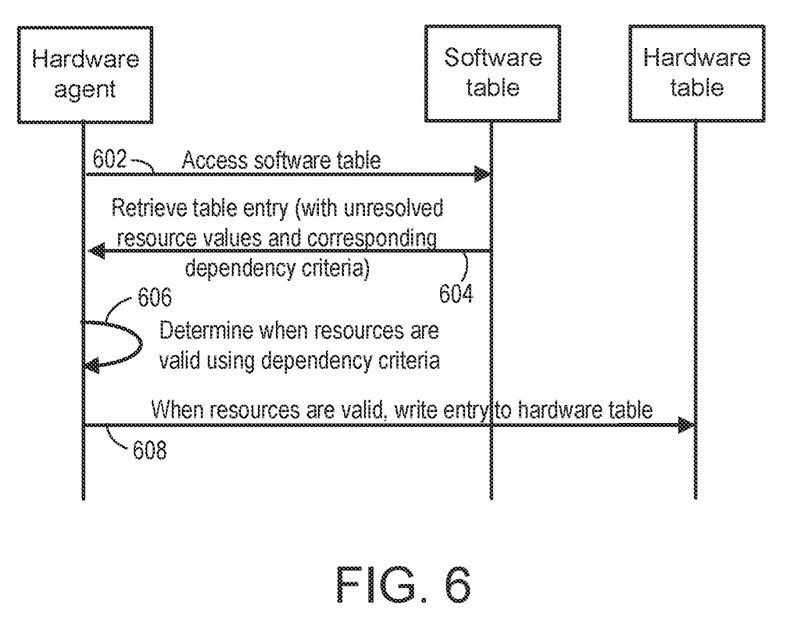
FIG. 6 is a transaction diagram illustrating the process of transferring an entry from a software table to a hardware table in accordance with some embodiments.

Referring to FIG. 6, a transaction diagram illustrating the process of transferring the entry from the software table to the hardware table is shown. As described above, the feature agent has constructed a table entry which contains one or more resource values and corresponding dependency criteria that must be used to determine the validity of these resource values before the entry can be written to the hardware table. This process is performed by a hardware agent of the network device.

FIG. 6 shows the transactions between the hardware agent, the software table in which the not-yet-valid table entry is stored, and the hardware table into which the entry will be written when all of the resource values are valid. The hardware agent first accesses the software table (602) and retrieves the table entry, including the not-yet-validated resource values, and the associated dependency criteria. The hardware agent then determines, for each of the not-yet-validated resource values, whether the corresponding dependency criteria have been met (satisfied) (606). If the dependency criteria have not yet been met, the hardware agent remains at this step and continues to attempt to validate the resource values. It should be noted that the unsatisfied dependency criteria blocks the hardware agent from processing only the software table containing the unsatisfied dependency criteria. The hardware agent can continue to process other software tables, and can return to this software table once the necessary information is available to resolve the dependency. When all of the resource values have been determined to be valid, the hardware agent writes the entry to the hardware table (608). The entry is then part of the programming of the network device and can be used for any associated purposes, such as forwarding packets that are processed by the network device.

Figure 7:
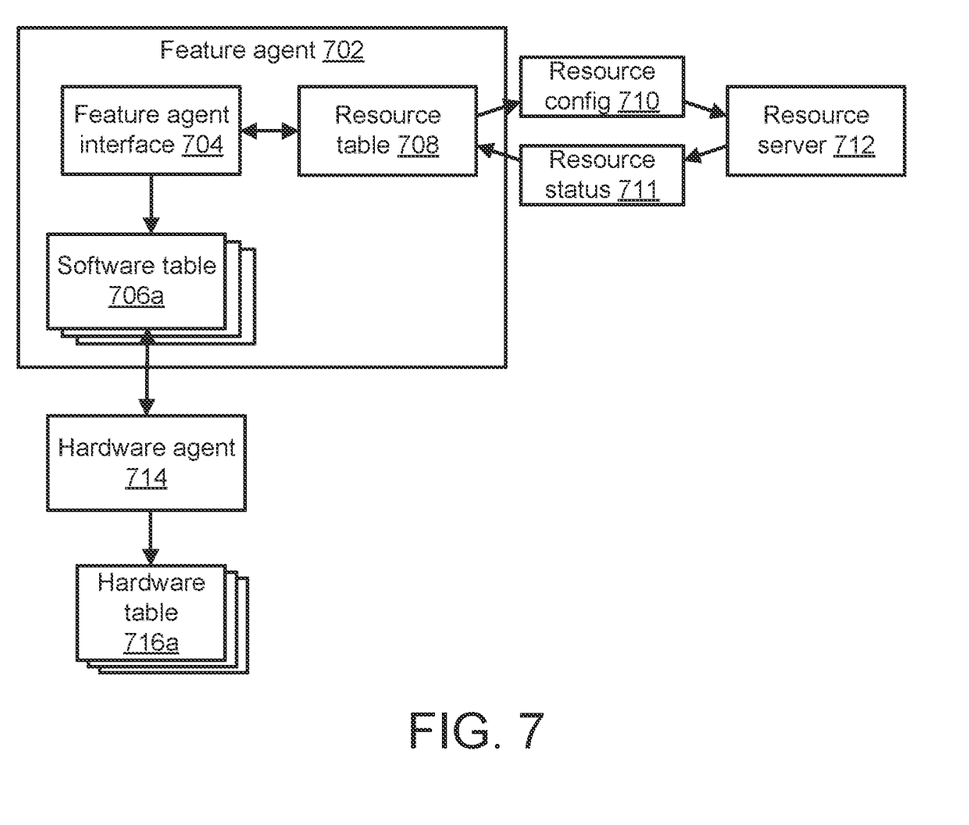
FIG. 7 is an example embodiment implemented in a network device in accordance with some embodiments.

FIG. 7 shows an example embodiment as implemented in a network device. In this system, a feature agent 702 of the network device includes a feature agent interface 704 as well as a set of one or more software tables 706 and a resource table 708. Resource table 708 is coupled to communicate with a resource server 712 through resource config 710 and resource status 711. Resource config 710 and resource status 711 may, for example, be registers or locations in a memory for storing requests, resolved resource values and dependency criteria. A hardware agent 714 of the network device is coupled to feature agent 702 so that it can access software tables 706. Hardware agent 714 is further coupled to a set of hardware tables 716 to which content from software tables 706 is to be written.

The system of FIG. 7 operates in a manner which is substantially similar to the embodiments described above. When feature agent interface 704 receives a message to write an entry to a software table, the feature agent accesses the software table's definition to determine the elements that are needed to construct the entry. If there are required elements which must be obtained from an external resource, feature agent interface 704 publishes an entry in resource table 708, which serves as a request for the element (a resource value) from a corresponding resource.

Publication of the entry in resource table 708 populates resource config 710, which is an interprocess communication mechanism between feature agent 702 and resource server 712. While resource config 710 provides a means for communication from resource table 708 to resource server 712, resource status 711 provides a corresponding means for communication in the opposite direction (from resource server 712 to resource table 708).

Resource server 712 reacts to the population of resource config 710 by resolving the requested resource. As explained above, this may result in a resource value that is not yet valid. In this case, resource server 712 generates one or more dependency criteria that are associated with the resource value, where the dependency criteria indicate conditions for the validity of the resource value. Resource server 712 then publishes both the resource value and the dependency criteria to resource status 711.

In response to the resource value and corresponding dependency criteria being published to resource status 711, resource table 708 obtains the resource value and dependency criteria and makes them available to feature agent interface 704. Feature agent interface 704 then constructs the software table entry using the not-yet-valid resource value and the corresponding dependency criteria. When construction of the entry is completed, the entry is written to the appropriate one of software tables 706. The entry in the software table includes the dependency criteria as well as the not-yet-valid resource value.

In some embodiments, it may be necessary to make writes to the tables of the network device in a particular order, so the network device may store indications of the order in logs that are maintained for this purpose. The feature agent may also update status indicators for the logs which show when the logs have been updated so that the hardware agent is aware of the update and can make the writes to the corresponding hardware tables.

After feature agent interface 704 has made one or more writes to software tables 706, hardware agent 714 begins processing the write(s) in the software tables. In response to determining that there are unprocessed writes in the software tables, hardware agent 714 identifies the next one of the software table entries that needs to be processed and accesses the corresponding table to retrieve the entry. In one embodiment, hardware agent 714 identifies the entry from the logs that are used to maintain the ordering of the writes to software tables 706.

When hardware agent 714 retrieves the entry from the software table, it processes the entry to prepare one or more corresponding writes to hardware tables 716. Hardware agent 714 may have to perform some translation of the content to place it in the appropriate form for the corresponding hardware table 716 to which it is to be written. This translation may involve, for example, reformatting the content of the entry to conform to a destination hardware table, splitting the content to form multiple entries to multiple hardware tables, combining content from multiple software table entries to form a single hardware table entry, etc.

Hardware agent 714 is also responsible for determining that the resource values contained in the entries are valid before writing corresponding hardware table entries containing these values to the hardware tables. This may be accomplished in a variety of ways, and may differ from one embodiment to another. In one embodiment, hardware agent 714 identifies these resource values and then accesses a corresponding entry in resource table 708 to determine a status of each resource dependency.

If the status of each dependency constraint associated with a resource value indicates that the dependency constraint has been met, the corresponding resource value is valid and can be used in a hardware table entry. If one or more of the dependency constraints associated with a resource value indicate that they have not yet been met, then the resource value is not yet valid and available for use in a hardware table entry. The hardware agent therefore continues to try to determine the validity of the resource value. The hardware agent may, for example, wait for some predetermined amount of time and then check the dependency constraint status again to determine whether it has been met, repeating this process until all of the associated dependencies have been met.

Once all of the resource values needed for a hardware table entry have been determined to be valid, the hardware agent completes its processing of the resource values and any other content from the software table entry which is necessary to complete the hardware table entry (or entries). The completed hardware table entry is then written to the appropriate one of the hardware tables.

After the hardware agent writes the content to the hardware table, it receives acknowledgment of the successful write from the hardware table. The hardware agent may then update a status of the write to provide an indication to the feature agent that the corresponding content has been successfully written to the appropriate hardware table(s). In some embodiments, the hardware agent may perform multiple writes to the hardware tables corresponding to multiple software table entries before updating the status.

There may be many alternative embodiments of the present systems and methods. For instance, another example embodiment comprises a method for handling resource requests in programming of network device tables. This method includes entering, by a feature agent of a network device, a resource request for a resource in a resource table, where each entry in the resource table includes a dependency constraint that encapsulates validity criteria for utilizing the corresponding resource. A server (which may be a second feature agent) then services the resource request and enters a response to the resource request, where the response includes the dependency constraint. The resource request may be communicated to the server via a resource config entry of a communication channel, and the requested resource may be returned from the server via a resource status entry of the communication channel. The feature agent then writes an entry to a software table, where the software table entry includes the resource and the corresponding dependency constraint. A hardware agent then writes an entry in a hardware table in accordance with the dependency constraint (i.e., when allowed by the dependency constraint), where the hardware table entry corresponds to the software table entry.

In some embodiments, the feature agent constructs the software table entry before the resource request is resolved by the server and before the dependency constraint has been satisfied. One or more additional software table entries may be written to the software table by the feature agent before it is determined whether the dependency constraints have been satisfied. The feature agent may operate asynchronously with respect to the resource server.

An alternative embodiment comprises a network device that may have one or more processors and memories. The network device has a feature agent and a hardware agent. The feature agent is configured to identify content required for a first entry to a first table, where the content includes at least a first resource value of a resource which is external to the feature agent. The content required for the first entry and the resource server may be identified in a definition for the first table. The feature agent may request the resource value from a resource table and may retrieve the first resource value and one or more corresponding dependency criteria from the resource table. The feature agent constructs the entry to the first table, where the entry to the first table contains the resource value and the corresponding dependency criteria. The feature agent constructs the entry to the first table before the dependency criteria have been met. The feature agent then writes the entry to the first table, which may be a software table of the feature agent. The hardware agent is configured to identify the resource value and the corresponding dependency criteria in the entry written by the feature agent to the first table. The hardware agent determines whether the dependency criteria have been satisfied and, in response to determining that the dependency criteria have been satisfied, writes a second entry to a second table, where the second entry containing the resource value. The second table containing the second entry may then be used by the network device to process network packets.

In some embodiments, the feature agent publishes a request for the first resource value to the resource table. The network device may also include a resource server which is configured to receive the request from the resource table, resolve the request, and return the resource value and the corresponding dependency criteria to the resource table. The network device may include a resource config and resource status memory storage, where the resource config memory storage receives the request from the resource table and is accessible by the resource server to retrieve the request, and where the resource status memory storage configured to receive the first resource value and the corresponding dependency criteria from the resource server, and is accessible by the resource table to retrieve the first resource value and the corresponding dependency criteria.

Another alternative embodiment is a computer program product comprising a non-transitory computer-readable medium storing instructions that are executable by a processor to perform a method including entering a request for a resource in a resource table. Each entry in the resource table includes a dependency constraint that encapsulates validity criteria for utilizing the corresponding resource. The method further includes receiving, from a server, a response to the resource request, where the response includes the dependency constraint. The method further includes writing an entry to a software table, where the software table entry includes the resource and the corresponding dependency constraint. The software table entry is constructed before the dependency constraint is resolved. After the dependency constraint is resolved, a hardware table entry is written to a hardware table, where the hardware table entry corresponds to the software table entry. The method further includes processing network packets according to this hardware table entry.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments will be employed without a corresponding use of other features, and features described with respect to one embodiment may be combined with features of other embodiments without departing from the scope and spirit of the disclosure as set forth.

What is claimed is:

1. A method for handling resource requests in programming of network device tables, the method comprising:
   entering, by a feature agent of a network device, a resource request for a resource in a resource table, wherein each entry in the resource table includes a dependency constraint that encapsulates validity criteria for utilizing the corresponding resource;
   receiving, by the resource table, a response to the resource request including the resource value and the dependency constraint;
   writing, by the feature agent, a software table entry to a software table, the software table entry including the resource value and the corresponding dependency constraint; and
   writing, by a hardware agent, a hardware table entry in a hardware table, the hardware table entry corresponding to the software table entry, the hardware agent writing the hardware table entry in accordance with the dependency constraint.

2. The method of claim 1, wherein the feature agent constructs the software table entry before the dependency constraint is resolved.

3. The method of claim 2, further comprising determining, by the hardware agent, that the dependency constraint has been satisfied.

4. The method of claim 2, further comprising writing, by the feature agent, a second software table entry to the software table before the dependency constraint is resolved.

5. The method of claim 1, wherein the feature agent comprises a first feature agent and wherein the resource and the dependency constraint are received from a second feature agent of the network device.

6. The method of claim 1, further comprising, in response to entering the resource request in the resource table, communicating the resource request to a server via a resource config entry of a communication channel and receiving the requested resource from a server via a resource status entry of the communication channel.

7. The method of claim 1, wherein the feature agent operates asynchronously with respect to a resource server.

8. The method of claim 1, wherein the validity criteria is associated with validity of the resource value; and wherein the hardware agent writing the hardware table entry in accordance with the dependency constraint comprises writing the hardware table entry in response to evaluating the validity criteria associated with the resource value to determine the resource value is valid.

9. A network device comprising:
   a feature agent of the network device configured to
   identify content required for a first entry to a first table, the content including at least a first resource value of a resource external to the feature agent,
   retrieve from a resource table the first resource value and one or more corresponding dependency criteria,
   construct the first entry to the first table, the first entry to the first table containing the resource value and the one or more corresponding dependency criteria, and
   write the first entry to the first table;
   a hardware agent configured to
   identify the resource value the and one or more corresponding dependency criteria in the first entry to the first table,
   determine whether the dependency criteria have been satisfied, and
   in response to determining that the dependency criteria have been satisfied, writing a second entry to a second table, the second entry containing the resource value.

10. The network device of claim 9, wherein the network device processes network packets according to the second entry in the second table.

11. The network device of claim 9, wherein the feature agent is further configured to, prior to retrieving the first resource value and the corresponding dependency criteria from the resource table, publish to a resource table a request for the first resource value.

12. The network device of claim 11, further comprising a resource server, the resource server configured to receive the request from the resource table, resolve the request, and return the resource value and the one or more corresponding dependency criteria to the resource table.

13. The network device of claim 9, further comprising a resource config memory storage and a resource status memory storage,
   the resource config memory storage configured to receive the request from the resource table, wherein the resource config memory storage is accessible by the resource server to retrieve the request from the resource config memory storage, and
   the resource status memory storage configured to receive the first resource value and the corresponding dependency criteria from the resource server, wherein the resource status memory storage is accessible by the resource table to retrieve the first resource value and the corresponding dependency criteria from the resource status memory storage.

14. The network device of claim 9, wherein the first table comprises a software table maintained within the feature agent.

15. The network device of claim 9, wherein identifying the content required for the first entry to the first table comprises identifying the content in a definition for the first table.

16. The network device of claim 15, wherein the feature agent is further configured to identify the resource server in the definition for the first table.

17. The network device of claim 9, wherein the feature agent is configured to construct the first entry to the first table before the dependency criteria corresponding to the resource value have been met.

18. A computer program product comprising a non-transitory computer-readable medium storing instructions executable by one or more processors to perform:
   entering, by a feature agent of a network device, a resource request for a resource in a resource table, wherein each entry in the resource table includes a dependency constraint that encapsulates validity criteria for utilizing the corresponding resource;

receiving, from a server, a response to the resource request including the dependency constraint in the resource table; and writing, by the feature agent, a software table entry to a software table, the software table entry including the resource and the corresponding dependency constraint.

19. The computer program product of claim 18, wherein the feature agent constructs the software table entry before the dependency constraint is resolved.

20. The computer program product of claim 18, further comprising resolving the dependency constraint, writing a hardware table entry in a hardware table, the hardware table entry corresponding to the software table entry, and processing network packets according to the hardware table entry.

* * * * *